Sept. 18, 1962     F. R. DINGER     3,054,262
INTEGRATED HYDRAULIC SYSTEM
Filed April 18, 1961     2 Sheets-Sheet 1
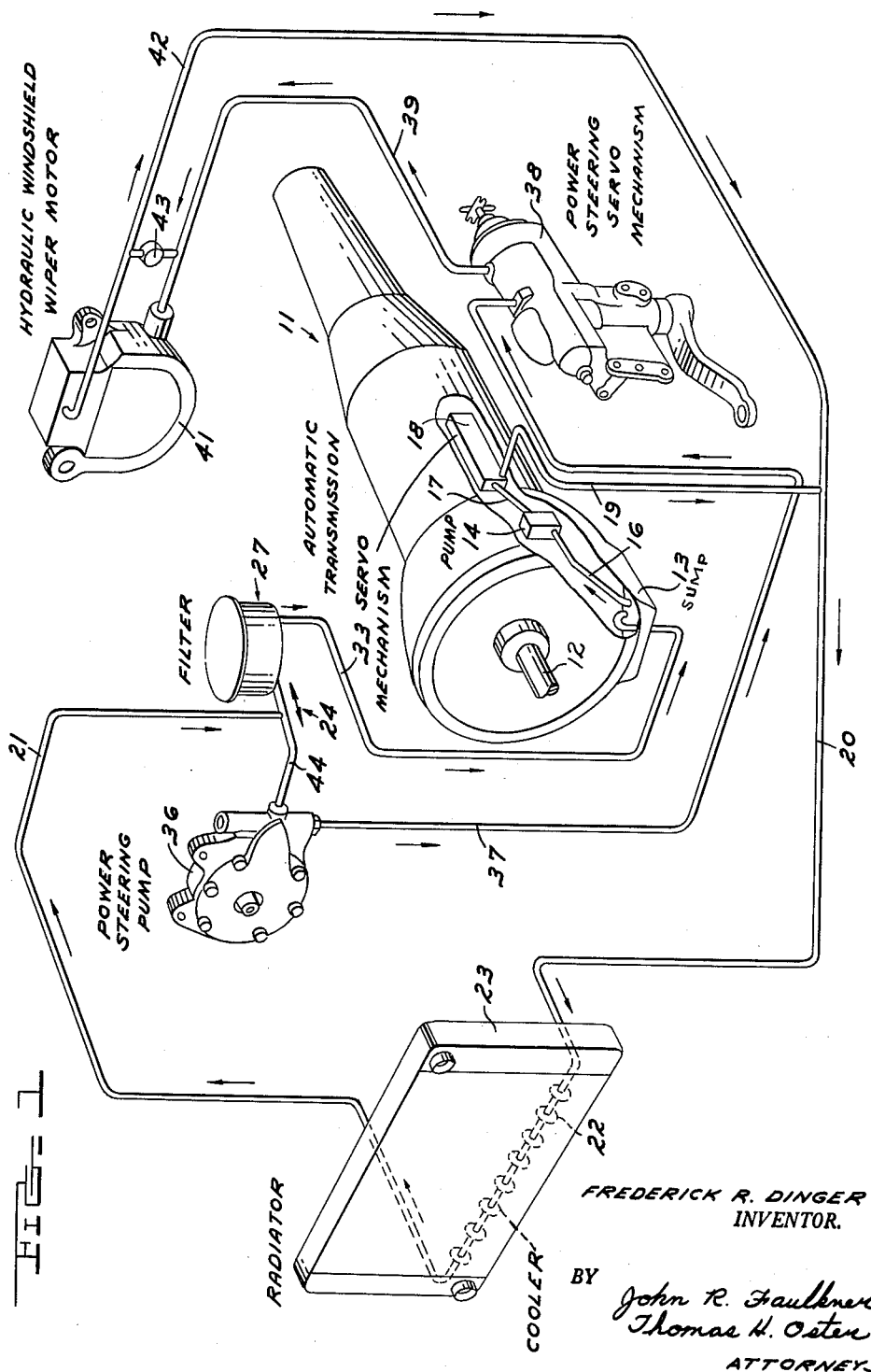
FREDERICK R. DINGER
INVENTOR.
BY John R. Faulkner
Thomas H. Oster
ATTORNEYS

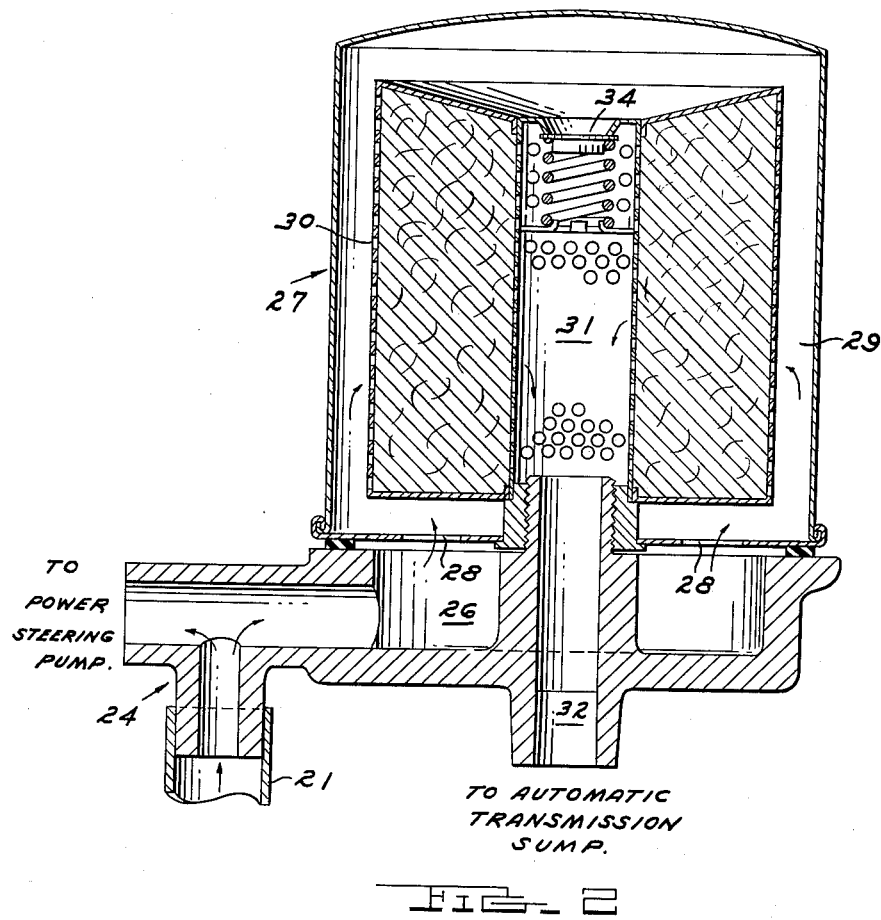

United States Patent Office 3,054,262
Patented Sept. 18, 1962

3,054,262
INTEGRATED HYDRAULIC SYSTEM
Frederick R. Dinger, Dearborn Township, Wayne County, Mich., assignor to Ford Motor Company, Dearborn, Mich., a corporation of Delaware
Filed Apr. 18, 1961, Ser. No. 103,854
6 Claims. (Cl. 60—52)

This invention relates to an integrated hydraulic system having at least two hydraulic branches. More specifically the invention relates to a pair of interconnected hydraulic branches, each branch having its own hydraulic pump and servo mechanism with one of the branches having a fluid restriction. The fluid restriction causes a back pressure in the hydraulic fluid in that branch causing the fluid in the other branch to be supercharged upstream of its hydraulic pump.

It is common practice for motor vehicles today to be equipped with a hydraulically operated automatic transmission, power steering system, and even a windshield wiper. The hydraulic system of the automatic transmission generally includes pump means, servo mechanism, sump, filter, and a cooler. The power steering system generally includes pump means, servo mechanism, sump, filter, and cooler. The hydraulic windshield wiper system may be simply a branch extension of the power steering hydraulic system.

Pumps when not supplied with an adequate charge of hydraulic fluid cavitate. As a result they are noisy, less efficient and subjected to accelerated wear. This problem of pump starvation is generally associated with power steering pumps during cold start conditions. The condition is temporary in nature and continues until the hydraulic fluid becomes sufficiently viscous to flow freely into the pump intake or inlet.

An embodiment of this invention may be directed to a means of supercharging the input hydraulic fluid of the power steering pump. This is accomplished by permitting the back pressure resulting from a fluid restriction in the automatic transmission hydraulic branch, such as caused by a filter, to be imparted through an interconnecting conduit to the upstream side of the power steering pump. Because of the interconnection of the automatic transmission branch and the power steering branch, a reduction in the number of parts is possible. For example, the automatic transmission sump, cooler and filter also may serve the power steering branch and any additional branches that may be used, such as the windshield wiper motor.

Other objects and advantages of this invention will become more apparent when considered in connection with the accompanying drawings, wherein:

FIGURE 1 is a semi-diagrammatic view partly cut away of a motor vehicle hydraulic system made in accordance with this invention, and FIGURE 2 is an enlarged cross sectional view of the filter shown in FIGURE 1.

Referring now to the drawings, an automatic transmission is shown indicated at 11 which has an input shaft 12 connected to the prime mover, such as an internal combustion engine (not shown). Input shaft 12 rotates as long as the engine is in operation. Transmission 11 is provided with a sump 13. A hydraulic pump indicated at 14 is driven by the input shaft 12 in a conventional and well known manner. Pump 14 likewise operates as long as the engine is in operation.

Pump 14 has an inlet conduit 16 which communicates with the sump 13. A conduit 17 connects the outlet of the pump 14 to the transmission servo mechanism indicated at 18. The transmission servo mechanism 18 exhausts continuously a part or all of the fluid passing through the servo mechanism 18 through conduit 19 and as long as the engine and, of course, pump 14 are in operation.

Conduit 19 may be connected to a conduit 20 which carries the fluid through a cooler 22 located in a radiator or heat exchanger 23. After passing through the cooler 22 in the radiator 23, a conduit 21 carries the fluid to T 24 located on the underside of a filter 27.

From the T 24 one of the paths that the hydraulic fluid takes is to the reservoir 26 located on the underside of the filter 27. Fluid from reservoir 26 passes through openings 28 into an annular chamber 29 surrounding a filtering media 30. The filtering media 30 creates a pressure differential in the hydraulic system by virtue of the fluid being slowed down as it passes through the filtering media 30. The fluid in the annular chamber 29 therefore is at a higher pressure than the fluid which has passed through the filtering media 30 into the central chamber 31. Central chamber 31 of the filter 27 empties into passage 32. Passage 32 is connected by conduit 33 which dumps the fluid into the automatic transmission sump 13.

In the event the filtering media 30 becomes clogged with contaminants, a conventional relief valve 34 permits the fluid to bypass the filtering media 30 and go directly into the central chamber 31.

Referring now to the power steering branch, the power steering pump is indicated at 36 and is driven by the engine at all times in any one of several well known ways. Because the power steering pump 36 must provide sufficient pressurized fluid at engine idle to operate the power steering servo mechanism indicated at 38, the pump 36 by necessity is of a high volume output type. The transmission pump 14 on the other hand is not required to put out a high volume output and may therefore operate at a considerably smaller volume output. Fluid on the exhaust or downstream side of the power steering pump passes through conduit 37 and into the input side of power steering servo mechanism 38.

The output or outlet side of the power steering servo mechanism 38 may be connected by conduit 39 to an accessory branch such as a hydraulic windshield wiper motor 41. The exhaust or output side of motor 41 is connected by conduit 42 to the conduit 20. Conduit 44 connects the tee 24 to the inlet or input side of the power steering pump 36. A bypass valve 43 may connect the conduits 39 and 42 so that all or a part of the fluid may bypass the motor 41. The windshield wiper branch is not essential to the operation of the invention.

During normal operating conditions, the engine driven pumps 14 and 36 supply fluid under pressure to their respective servo mechanisms 18 and 38. The fluid supplied to the power steering servo mechanism 38 by the power steering pump 36 is returned to the T 24 through conduit 21 and is available at the inlet side of the pump 36. Return fluid from the transmission servo mechanism 18 is also transmitted to the T 24 through the conduit 21. A portion of the total return fluid passes through the filtering media 30 in the filter 27 and creates back pressure in the T 24 and the conduit 44 at the inlet of the power steering pump 36. A supercharging of the power steering pump input fluid immediately takes place. Cavitation and its concomitant deleterious effects are thus eliminated or reduced to an acceptable value.

The interconnection of the automatic transmission and power steering branches in the above described manner also results in the simplification of the branches, in the reduction of the total number of parts used by both branches, and in the reduction of fluid required for both branches. For example, one cooler may now satisfactorily control the temperature of the fluid used in both branches. The one filter ultimately filters all of the fluid even though it only filters that portion of the fluid which goes through the automatic transmission branch. Furthermore, the transmission sump 13 serves both branches. It is to be noted that even though there is an interconnection between the automatic transmission branch and the power steering branch, neither branch is adversely affected by the interconnection. The power steering branch is, of course, advantageously affected by the interconnection.

Although the invention is described with reference to a motor vehicle application, it is not so limited and may be applied to other hydraulic applications. It is also possible to vary the number of elements in each of the branches. If filtering means are not required, it is possible to employ other means to obtain a fluid restriction such as an orifice or valve.

It will be understood therefore that this invention is not to be limited to the exact construction shown and described but that various changes and modifications may be made without departing from the spirit and scope of the invention as defined in the appended claims.

I claim:

1. A hydraulic system comprising a first hydraulic branch and a second hydraulic branch in parallel, said first hydraulic branch comprising a pump, a servo mechanism, and conduit means connecting the pump and servo mechanism in series, said second hydraulic branch comprising a second pump, a second servo mechanism, and second conduit means connecting said second pump and second servo mechanism in series, said second hydraulic branch having a fluid restriction creating a pressure differential in the second hydraulic branch, and third conduit means connecting the first and second conduit means upstream of the first pump and upstream of said fluid restriction to supercharge said first pump.

2. A hydraulic system comprising a first hydraulic branch and a second hydraulic branch in parallel, said first hydraulic branch comprising a pump, a servo mechanism, and conduit means connecting the pump and servo mechanism in series, said second hydraulic branch comprising a second pump, a second servo mechanism, filter means, and second conduit means connecting said second pump, second servo mechanism, and filter in series, said filter creating a fluid restriction and thereby creating a pressure differential in the second branch, and third conduit means connecting said first and second conduit means upstream of the first pump and upstream of said filter to supercharge said first pump.

3. A hydraulic system comprising a first hydraulic branch and a second hydraulic branch in parallel, said first hydraulic branch comprising a pump, a servo mechanism, and conduit means connecting the pump and servo mechanism in series, said second hydraulic branch comprising a second pump, a second servo mechanism, a sump, and second conduit means connecting said second pump, second servo mechanism, and sump in series, said second hydraulic branch having a fluid restriction creating a pressure differential in the second branch, and third conduit means connecting the first and second conduit means upstream of the first pump and upstream of said fluid restriction to supercharge said first pump, said sump being sufficiently large in volume to contain surplus fluid for both said first branch and said second branch.

4. A motor vehicle hydraulic system having at least a power steering branch and an automatic transmission branch, said power steering branch comprising a power steering pump, power steering servo mechanism, and conduit means connecting said power steering pump and said power steering servo mechanism in a hydraulic series fluid flow, said automatic transmission branch comprising an automatic transmission pump, an automatic transmission servo mechanism, a sump, filter means, and second conduit means connecting said automatic transmission pump, automatic transmission servo mechanism, filter, and sump in a hydraulic series fluid flow, and third conduit means providing a hydraulic fluid path between the first conduit means upstream of the power steering pump means and the second conduit means upstream of the filter means, said filter means causing a back pressure of the hydraulic fluid flow in the second conduit means sufficient to supercharge the hydraulic fluid flow in the first conduit means through the third conduit means to provide a supercharged fluid supply for said power steering pump.

5. The structure defined by claim 4 which is further characterized by a cooler disposed in said third conduit means whereby the fluid used in both the power steering branch and the automatic transmission branch are simultaneously cooled.

6. A hydraulic system comprising a first hydraulic branch and a second hydraulic branch in parallel, said first hydraulic branch comprising a pump, a servo mechanism, and conduit means connecting the servo mechanism to the pump downstream of the pump, said second hydraulic branch comprising a second pump, a second servo mechanism, and second conduit means connecting the second servo mechanism to the second pump downstream of the second pump, flow divider means, third conduit means connecting the first servo mechanism and the second servo mechanism downstream of the flow divider, fourth conduit means connecting the flow divider means to the first pump upstream of the first pump, and fifth conduit means connecting the flow divider means to the second pump upstream of the second pump, said fifth conduit means having a fluid restriction creating a pressure differential in the fifth conduit means thereby supercharging the fluid in the fourth conduit means upstream of said first pump.

References Cited in the file of this patent

UNITED STATES PATENTS

| | | |
|---|---|---|
| 2,325,931 | Avigdor | Aug. 3, 1943 |
| 2,679,206 | Huber | May 25, 1954 |
| 2,821,140 | Pettibone | Jan. 28, 1958 |
| 2,960,829 | Ross | Nov. 22, 1960 |
| 2,973,714 | Oishei | Mar. 7, 1961 |
| 2,983,226 | Livermore | May 9, 1961 |